United States Patent Office 3,159,073
Patented Dec. 1, 1964

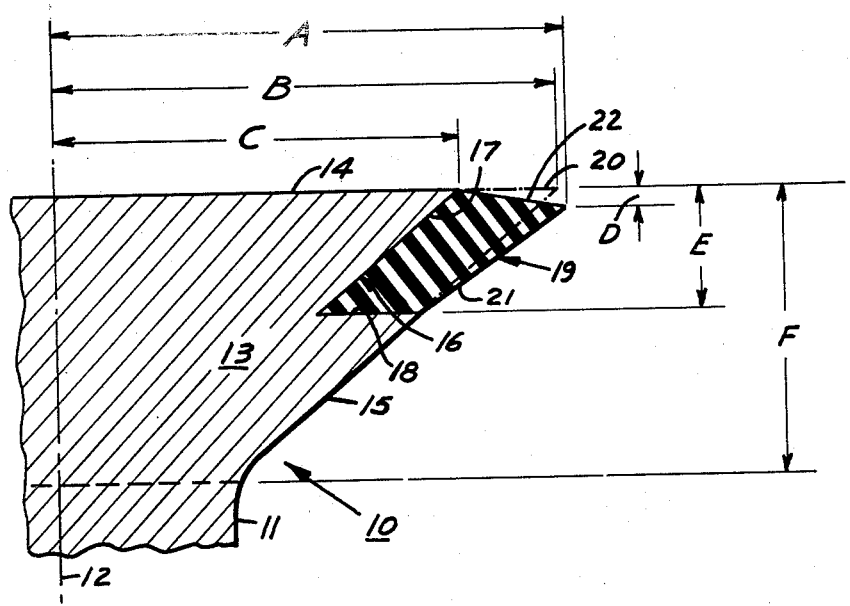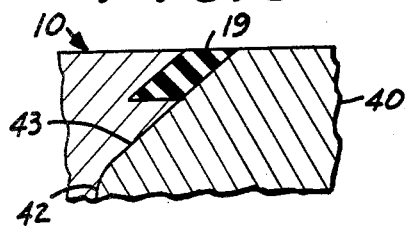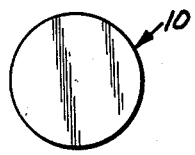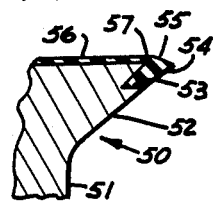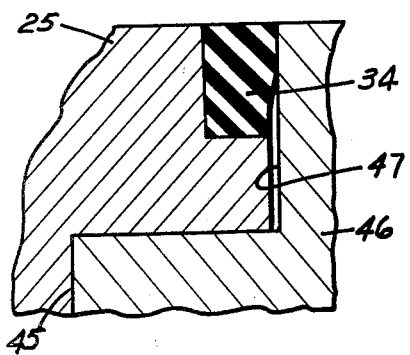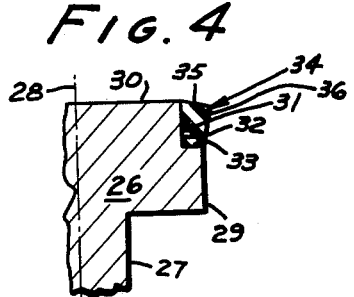
INVENTOR.
WILLIAM R. DICKIE
ATTORNEYS.

3,159,073
FASTENER PROTECTIVE SEALING MEANS
William R. Dickie, Manhattan Beach, Calif., assignor to Hi-Shear Corporation, Torrance, Calif., a corporation of California
Filed Mar. 23, 1961, Ser. No. 97,938
8 Claims. (Cl. 85—9)

This invention relates to a fluid sealing fastener.

Fluid sealing fasteners of the class which utilize a deformable sealing ring around the shank or head of an object are well known. The purposes of these conventional devices has been to make a seal around a fastener that holds together a tank or other enclosure. They have not had as their purpose the protection of the fastener itself by excluding fluid from the space between the fastener and the wall of the hole in which it fits. Such protection has not heretofore been considered to be necessary. However, recent developments have raised the requirement for sealing tanks and the like to include protection of the fastener itself, because with some materials of construction and some fluids, concentration cell corrosion becomes a problem. This corrosion thrives when there is liquid in a small surrounded space, and when it occurs rapidly destroys the fastener and surrounding structure. Accordingly, the standard means of sealing around fasteners is no longer satisfactory for many uses because concentration cell corrosion occurs.

An object of this invention is to provide a fastener with sealing means at its head which serve to protect the fastener against seepage of fluid to the region between the fastener and the body in which it fits, thereby protecting the fastener and body against concentration cell corrosion.

This invention is carried out in a fastener which comprises an elongated shank with an integral enlarged head. The head has a periphery coaxial with the shank, at least a portion of which is a surface of revolution spaced from the head end of the fastener. There is a peripheral groove in the head contiguous to the head end and to the surface of revolution. It is open at the head end.

A peripheral sealing ring is bonded in the groove. It has an end surface at the head end and a side surface. The side surface flares outwardly from the surface of revolution toward the head, and the end and the bottom surfaces of the sealing ring are unconfined. Then when the shank is passed through a hole in the body and the head enters an enlarged body opening concentric with the hole, the sealing ring makes contact with the wall (starting at a location spaced from the surface of revolution) of the enlarged body opening to form a seal between the head and the body, which is biased against flow from the head end; that is, fluid pressure at the head end tends to make the seal tighter, thereby protecting the surface of revolution and the shank from fluid seepage from the head end.

The above and other features of this invention will be fully understood from the following detailed description and the accompanying drawings in which:

FIG. 1 is a fragmentary cross-section of the presently preferred embodiment of the invention;

FIG. 2 is a top view of FIG. 1;

FIG. 3 is a view of the embodiment of FIG. 1 installed in a body;

FIG. 4 is a fragmentary cross-section of still another embodiment of the invention;

FIG. 5 is a fragmentary cross-section showing the embodiment of FIG. 4 installed in a body; and FIG. 6 is a fragmentary cross-section of still another embodiment of the invention.

In FIG. 1, there is shown a fastener 10 having an elongated shank 11 with a central axis 12. A radially enlarged head 13 is integral and coaxial with the shank. The head has a head end denoted by numeral 14.

The periphery of the head has a portion which is a surface of revolution 15. In FIG. 1, the surface of revolution is the frustum of a cone. At the head end and contiguous to both the head end and to the surface of revolution, there is a peripheral groove 16 which has bottom surfaces 17, 18. Surface 17 is frustoconical, and surface 18 is a disc. The groove is open at the head end of the fastener.

A sealing ring 19 is bonded to bottom surfaces 17 and 18 and preferably covers all of said bottom surfaces. Dotted lines 20 show the shape of material removed from the head of a standard counter-sink head to form the peripheral groove. Preferably, but not necessarily, the volume of the sealing ring will be substantially equal to the volume of the material which was so removed. The removed material is defined by said dotted lines which represent continuations of a flap top of the head and of the surface of revolution. The equivalent volume in a curved head, such as a filister head, would be that bounded by a plane normal to the axis and axially even with the top of the groove, and such as the frustoconical surface defined as a continuation of surface of revolution 15.

The ring, which is of deformable, preferably non-compressible material such as neoprene, silicone rubber, or other sealing material, flares outwardly from the surface of revolution and has its lower end contiguous to and of the same diameter as the upper end of the said surface of revolution. Thus, it will be seen that the side surface 21 of the sealing ring is a conical frustum of larger angle than surface 15, which flares radially outward beyond the continuation of the surface of revolution toward the head end. The end surface 22 of the sealing ring may conveniently slope downwardly and outwardly in FIG. 1 so that, as the sealing ring is deformed radially inwardly, the end surface will move up to become substantially flush with the top of the fastener, but this is an optional feature primarily useful should a substantially flush surface be desired.

Typical dimensions in inches for a suitable device of this type are as follows:

Table

| | |
|---|---|
| Twice A (diameter) | .506, .501 |
| Twice B (diameter) | .4666, .4618 |
| Twice C (diameter) | .4276, .4228 |
| D | .010 |
| E | .046±.002 |
| F | .108, .106 |

Another embodiment of the invention is shown in FIGS. 4 and 5, showing its use in connection with a fastener 25, which has a standard round head 26 integral with a shank 27, the fastener having a central axis 28. The head of the fastener has a peripheral surface of revolution 29 spaced from its head end 30, this surface of revolution being cylindrical. At the upper end of surface of revolution and contiguous thereto, there is a peripheral groove 31, having bottom surfaces 32, 33, and opening at the head end. Bonded to said bottom surfaces and preferably completely covering the same, there is a sealing ring 34 of the same materials as sealing ring 19 of FIG. 1. This sealing ring has an end surface 35 and a side surface 36. Side surface 36 is preferably substantially frustoconical while the end surface slopes downwardly and radially outward with reference to FIG. 4 so that the side surface tapers outwardly and away from the surface of revolution at a greater conical angle.

FIG. 6 shows a modification of the invention wherein a protective coating is provided for the fastener head.

A fastener 50 has a shank 51, counter-sink head 52 and peripheral groove 53 identical to the corresponding elements of FIG. 1. It also includes a sealing ring whose side surface 54 is identical to that in FIG. 1. The end surface 55 differs from that of FIG. 1 in that it is higher than the head by an amount sufficient to fair into and be integral with a head protective layer 56 bonded to the head end. This layer, which will preferably be made of the same material as the sealing ring, may be formed and applied in the same operation, so that it and the ring are of one piece. The layer extends to a line about even with the outer extreme of the head end (this extreme being denoted by numeral 57). End surface 55 slopes downwardly and outwardly from this extreme to its intersection with side surface 54. The protective layer can be applied to the embodiment of FIG. 4 in the same manner as with that of FIG. 1.

The use of the fastener of FIG. 1 is shown in FIG. 3 installed in a body 40 to seal the fastener against seepage from the region above the body and above the head of the fastener. The body has a hole 42 for passing the shank of the fastener, and a counter-sink 43 forming an enlarged body opening. The counter-sink angle is equal to that of the fastener head; that is, it is the same as the conical angle of surface of revolution 15. It will be observed that the sealing ring has made contact with the wall of the counter-sink, making initial contact at a location spaced from the surface, the line of contact moving toward the surface of revolution as the fastener is tightened down. The ring has been deformed so that it recedes into the groove and also rises therein, thereby creating a substantially flush top surface. It should be observed that the ring's pressure against the wall is biased against the fluid from an upward direction; that is, it will be more difficult for fluid to flow downward in FIG. 3 than upward in FIG. 3 because of the nature of the distorting forces and the restoring forces of the ring material. The fluid pressure makes the seal even tighter. The surface of revolution and the shank of the fastener are therefore entirely protected from fluid seepage, thereby eliminating the cause of concentration cell corrosion. Also, fluid above the fastener head is kept thereby the seal so that there is no leakage at this point.

FIG. 5 illustrates another advantage obtainable by use of this invention. It will be observed that while the shank may make a reasonably close fit in a hole 45 in a body 46, the head of the fastener does not make a particularly close fit in counter-bore 47. However, the radial distance by which the sealing ring projects beyond the surface of revolution is greater than the spacing between the wall of the counter-bore and the surface of revolution so that a contact is made between the sealing ring and the wall of the counter-bore. It will thereby be seen that a firm biased contact is made between the sealing ring and the wall of the counter-bore which is made tighter by a fluid pressure from the top.

The function of the fastener of FIG. 6 is identical to that of FIGS. 1 and 4, and has the additional advantage of the protective layer on the head end.

This invention thereby provides a sealing means adaptable to shank-type fasteners, such as bolts, rivets, and the like, which provide protection for the fastener itself while the fastener accomplishes its sealing function.

This invention is not to be limited by the embodiments shown in the drawings and described in the description which are given by way of example and not of limitation, but only in accordance with the scope of the appended claims.

I claim:

1. A fastener comprising an elongated shank having a central axis, an integral enlarged head adapted to bear against an object to exert an axial force against it, thereby to hold the object assembled to another object, the head having a top surface on the opposite side thereof from the shank, and a periphery coaxial with the shank, at least a portion of which is a surface of revolution spaced from the head end of the fastener, said head having a peripheral groove contiguous to the head end and to the surface of revolution, and open at the head end, and a peripheral sealing ring of deformable material bonded in said groove having an end surface at said head end and a side surface, said side surface standing outwardly of the said surface of revolution at the head end, the end surface of the ring being open at the top surface of the enlarged head, and the end surface at the head end and the side surface of the sealing ring both being unconfined, whereby when the shank is passed through a hole in a body and the head enters an enlarged body opening concentric with said hole, which enlarged body opening is of generally the same shape as said surface of revolution, the standing outwardly portion of the sealing ring makes contact with the wall of the enlarged body opening to form a seal between the head and the body at the head end of the fastener, thereby protecting the surface of revolution and the shank from fluid seepage from the head end.

2. A fastener according to claim 1 in which the sealing ring covers and is bonded to the entire base of the groove.

3. A fastener according to claim 1 in which the volume of the sealing ring is substantially equal to the volume of fastener material removed to form the groove.

4. A fastener according to claim 1 in which the end of the surface of revolution closest to the head end, and the end of the sealing ring contiguous to it have the same diameter.

5. A fastener according to claim 1 in which the surface of revolution is frusto-conical.

6. A fastener according to claim 1 in which the surface of revolution is cylindrical.

7. A fastener according to claim 1 in which a protective layer is bonded to the entire surface of the head end of the fastener.

8. A fastener according to claim 7 in which the protective layer is made of the same material as, and integral with, the sealing ring.

References Cited in the file of this patent

UNITED STATES PATENTS

| | | |
|---|---|---|
| 2,326,455 | Gray | Aug. 10, 1943 |
| 2,751,806 | Dickie | June 26, 1956 |
| 2,977,974 | Brown | Apr. 4, 1961 |
| 2,995,057 | Nenzell | Aug. 8, 1961 |